(12) United States Patent
Lee et al.

(10) Patent No.: US 6,823,081 B2
(45) Date of Patent: Nov. 23, 2004

(54) GENERATION OF A COLOR DROPOUT FUNCTION FOR USE IN ELECTRONIC COLOR DROPOUT

(75) Inventors: Yongchun Lee, Rochester, NY (US); George O. Simmons, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 627 days.

(21) Appl. No.: 09/845,903

(22) Filed: Apr. 30, 2001

(65) Prior Publication Data

US 2002/0168102 A1 Nov. 14, 2002

(51) Int. Cl.[7] .............................................. G06K 9/00
(52) U.S. Cl. ...................................... 382/163; 382/176
(58) Field of Search ............................... 382/163, 167, 382/162, 176, 175; 358/3.26, 517, 538, 453

(56) References Cited

U.S. PATENT DOCUMENTS

| 5,014,328 | A | * | 5/1991 | Rudak | 382/163 |
|---|---|---|---|---|---|
| 5,014,329 | A | * | 5/1991 | Rudak | 382/163 |
| 5,459,797 | A | * | 10/1995 | Sato | 382/165 |
| 5,583,659 | A | | 12/1996 | Lee et al. | 358/455 |
| 5,621,816 | A | * | 4/1997 | Ruppert | 382/163 |
| 5,841,899 | A | * | 11/1998 | Ide et al. | 382/168 |
| 6,701,009 | B1 | * | 3/2004 | Makoto et al. | 382/164 |

\* cited by examiner

*Primary Examiner*—Bali Vikkran
*Assistant Examiner*—Colin LaRose
(74) *Attorney, Agent, or Firm*—Peyton C. Watkins

(57) ABSTRACT

A method for performing color dropout on a digitized document, the method comprises the steps of obtaining color values from the digitized document for background and a color of interest to a user; transforming the color values of the background and the color of interest into an identical gray scale value according to a color dropout function; obtaining a gray scale value different from the identical gray scale value for the remaining portion of the image according to the color dropout function; and thresholding the gray scale values obtained from the previous steps to obtain a binary image that substantially eliminates color classification error which retains character integrity by a functional transformation that suppresses color fringe artifacts.

9 Claims, 2 Drawing Sheets

GENERATION OF A COLOR DROPOUT FUNCTION FOR USE IN ELECTRONIC COLOR DROPOUT

FIELD OF THE INVENTION

The present invention relates to document scanners and, more particularly, to a method and apparatus for functionally transforming a color image into a gray scale image in which the specified color is eliminated in business documents produced therefrom.

BACKGROUND OF THE INVENTION

A typical business form contains data represented by a finite number of colors. For example, these forms usually have lines, pre-printed text and background colors all of which are light reflecting colors (non-black), and black-colored informational text input by the user. When these forms are scanned by flatbed scanners or rotary-type scanners, undesirable extra colors are reproduced on the edges of the lines and text. These false colors are generated in the scanning process due to chromatic aberration and physical misregistration of RGB signals. These extra colors on the edges are referred to in the art as color fringes, which obviously do not exist in the original business form document.

For automatic document indexing, only the written text is interested and processed by optical character recognition (OCR). Pre-printed lines, background colors and the like on the form are deleted before OCR for minimizing interference of lines in OCR in order to yield better OCR read rate, referred to in the art as color dropout. In the prior art, the occurrence of color fringes results in errors during color dropout due to incorrect color classification. For example, due to color fringes or the written text overwriting on the pre-printed color lines, the color of a pixel on an edge to be retained may be substantially identical to the color of interest to be deleted by dropout. These extra colors generated in the scanning process make it is difficult to achieve error-free color dropout without losing some edge pixels of image objects to be retained.

Consequently, a need exists for a color dropout technique that retains image information while completely eliminating a specified color.

SUMMARY OF THE INVENTION

The present invention is directed to overcoming one or more of the problems set forth above. Briefly summarized, according to one aspect of the present invention, the invention resides in a method for performing color dropout on a digitized document, the method comprises the steps of (a) obtaining color values from the digitized document for background and a color of interest to a user; (b) transforming the color values of the background and the color of interest into an identical gray scale value according to a color dropout function; (c) obtaining a gray scale value different from the identical gray scale value for the remaining portion of the image according to the color dropout function; and (d) thresholding the gray scale values obtained from steps (b) and (c) to obtain a binary image that substantially eliminates color classification error which retains character integrity by a functional transformation that suppresses color fringe artifacts.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a portion of the present invention will be described in the preferred embodiment as a software program. Those skilled in the art will readily recognize that the equivalent of such software may also be constructed in hardware.

It will facilitate understanding of the preferred embodiment to note that the phrase pre-determined, light reflecting color as used herein means all colors except black.

Figure 1:
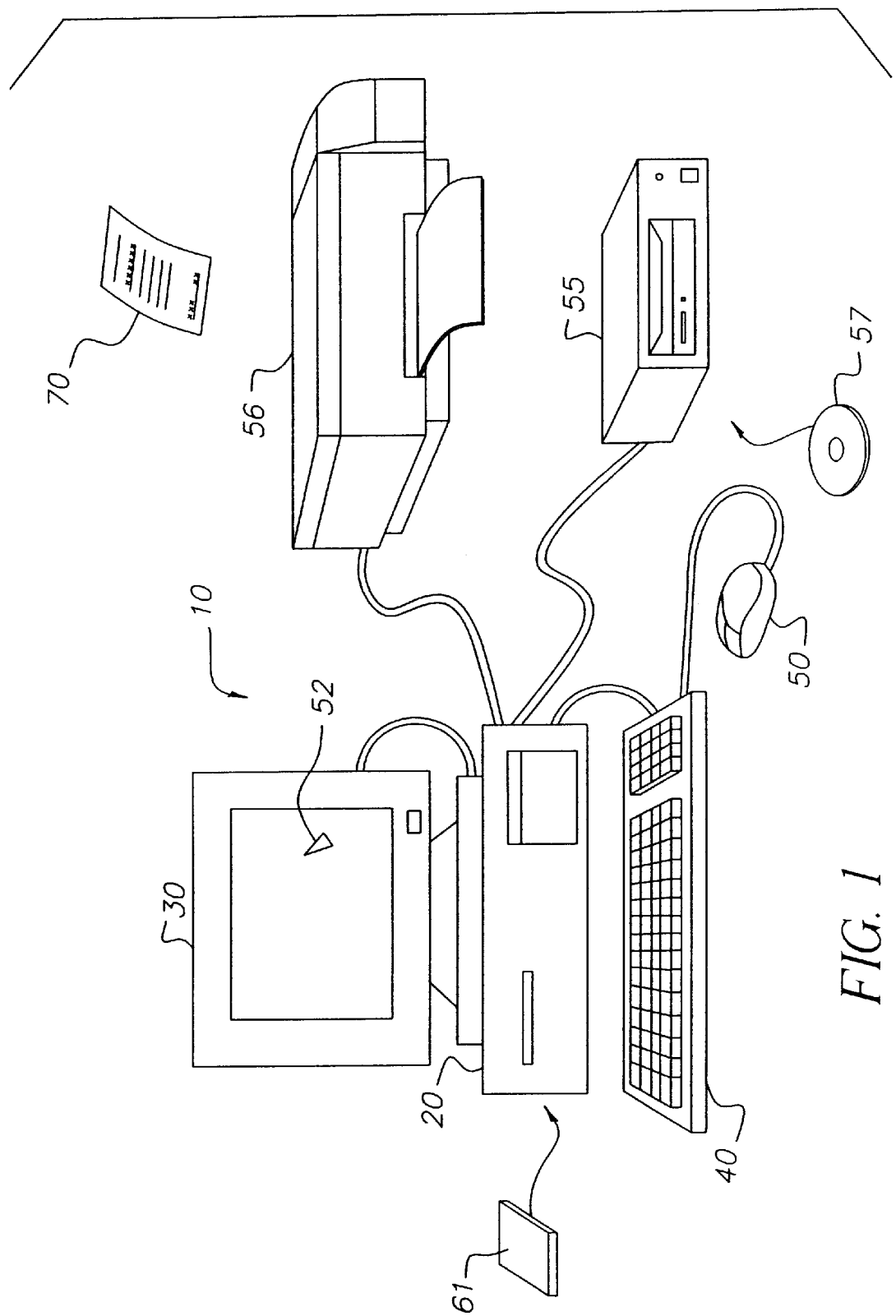
FIG. 1 is a perspective view of a computer system of the present invention.

Referring to FIG. 1, there is illustrated a computer system 10 for implementing the training or initialization portion of the present invention. Before describing the specific implementation used on the computer system 10, a brief overview will be described. In this regard, the computer system 10 includes a microprocessor-based unit 20 for receiving and processing software programs and for performing other processing functions. A display 30 is electrically connected to the microprocessor-based unit 20 for displaying user-related information associated with the software. A keyboard 40 is also connected to the microprocessor based unit 20 for permitting a user to input information to the software. As an alternative to using the keyboard 40 for input, a mouse 50 may be used for moving a selector or icon 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57. The compact disk 57 typically includes digitized information or data, such as business forms, images and the like. In addition, a floppy disk 61 may also include a software program or digitized data, and is inserted into the microprocessor-based unit 20 for inputting the software program. Still further, the microprocessor-based unit 20 may be programmed, as is well know in the art, for storing the software program internally. A printer 56 is connected to the microprocessor-based unit 20 for printing a hardcopy of the output of the computer system 10.

Still referring to FIG. 1, there is shown a business document 70 having pre-printed lines and text, for example instructional information, which are usually in some pre-determined, light reflecting color such as red. Consumers may type or write text, usually black colored, onto the lines according to the instructional information. The business form 70 is digitized and input into the computer system 10 by any of the above methods or any other suitable means. It is instructive to note, however, that the business form 70 may or may have consumer-inputted text when input into the computer system 10.

The image is displayed on the display 30 and the microprocessor-based unit 20, which is programmed with a program of the present invention. The user sequentially selects in any order the background and the pre-printed information via the mouse for retrieving the red, green and blue (RGB) pixel values at the selected locations. The respective pixel values are then stored in a scanner for processing of forms of this type, as will be described hereinbelow. The above process is repeated for each form to be used by end-users so that pixel values for the background and pre-printed information are available for input into the scanner for each type of form.

Figure 2:
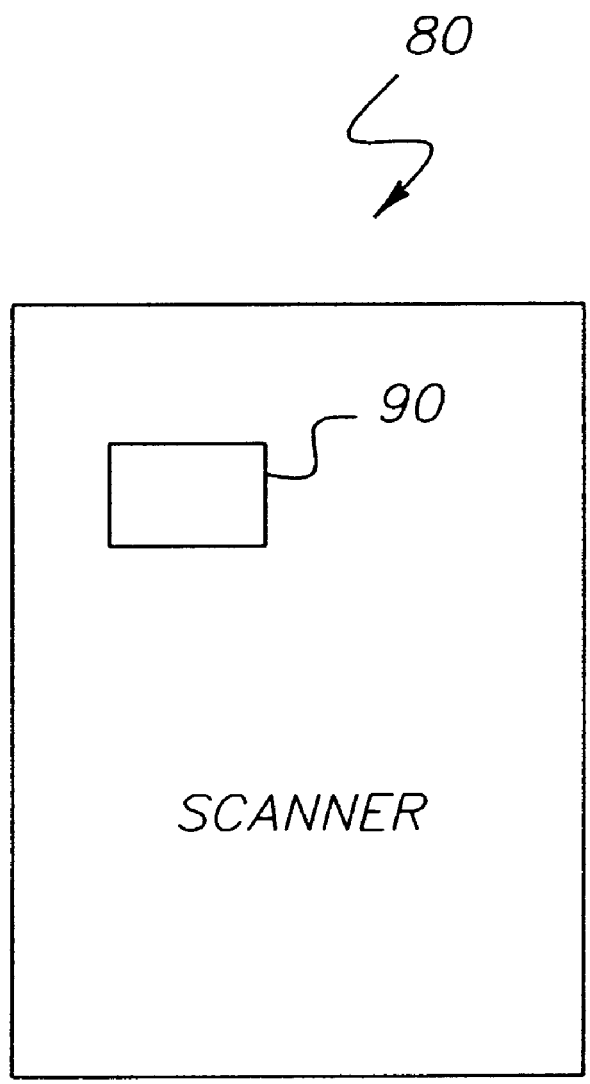
FIG. 2 is schematic drawing of a scanner of the present invention.

Referring to FIG. 2, the scanner 80 receives one of the hardcopy business forms 70, which scanner creates a digital representation of the document via components (not shown) in the interior portion of the scanner. The digital representation is typically represented in three colors—red, green and blue (r, g, b). The user inputs the particular business form 70 that has been scanned via any well known suitable means such as via a keypad or the like.

A processor 90 in the interior portion of the scanner is programmed with a software program of the present invention for deleting the pre-printed information and any background color, hereinafter referred to as color dropout. The program retrieves the stored ($r_i$, $g_i$, $b_i$) values for the background and pre-printed lines and inputs them into an objective function as shown in Eq. (1) subject to the constraints of Eq. (2). The results of the minimization process are the three values designated by (R G B).

$$\sum_{i=1}^{i=n}\sum_{j=1+i}^{j=n} |D(r_i, g_i, b_i, R, G, B) - D(r_j, g_j, b_j, R, G, B)| \quad (1)$$

$$R > \max(r_1, r_2, r_3, \ldots) \text{ or } R < \min(r_1, r_2, r_3, \ldots)$$
$$G > \max(g_1, g_2, g_3, \ldots) \text{ or } G < \min(g_1, g_2, g_3, \ldots) \quad (2)$$
$$B > \max(b_1, b_2, b_3, \ldots) \text{ or } B < \min(b_1, b_2, b_3, \ldots)$$

where ($r_i$, $g_i$, $b_i$) is the color of interest (typically the pre-printed lines), n is number of color data collected, and ($r_j$, $g_j$, $b_j$) is the background color.

The D(r,g,b,R,G,B) is defined as an objective function in which the R, B, and G are searched to make the D( ) value of the specified color triplet ($r_c$, $g_c$, $b_c$) identical to the D( ) value of the background color triplet ($r_b$, $g_b$, $b_b$). The search of R, G, B values requires a color data set read from the pixels of the specified color and the background in a scanned color form. Assume that there are "n" color triplets, ($r_1$,$g_1$, $b_1$), ($r_2$,$g_2$,$b_2$), ($r_3$,$g_3$,$b_3$), . . . ($r_n$,$g_n$,$b_n$) are collected. The search of R, G, B values is made by minimization of the Eq(1) subject to the constraints of equation (2).

The Definition of the function D in Eq(1) is as follows:

The invention is achieved by the weighted sum of the three modified red (r), green (g) and blue (b) gray scale values read in a captured color image as indicated in Eq (3). It is made by first adjusting the gray scale values of the red, green and blue values through three individual attenuation function, A(r, R), A(g, G) and A(b, B), separately. The three adjusted (red, green, blue) values are then weighted by their individual normalized coefficients, $C_R$, $C_G$, and $C_B$. The sum of the three weighted and attenuated red, green and blue gray values is taken as the gray scale value of color dropout. The normalized coefficients are defined as in Eq (4), and the three linear attenuation functions are then defined as in Eq (5).

$$D(r, g, b, R, G, B) = C_R * A(r, R) + C_g * A(g, G) + C_B * A(b, B) \quad (3)$$

$$C_R = R/(R+G+B)$$

$$C_G = G/(R+G+B) \quad (4)$$

$$C_B = B/(R+G+B)$$

$$A(r, R) = L_o * (1-|r-R|/255)$$
$$A(g, G) = L_o * (1-|g-G|/255) \quad (5)$$
$$A(b, B) = L_o * (1-|b-B|/255)$$

In the equations, the unknown data to be found are the upper case R, G and B. The lower case, r, g, and b are the given input color data from measurement. D(r, g, b, R, G, B) is the gray scale value in the range of 0–255 after color dropout. The value range of attenuation functions is also between 0–255. $L_o$ is the scale factor for white intensity in the range of 200–255.

After the iterative search for R, G and B values in order to accomplish the best fit of the measured red, green and blue color values in Eq (1), the three unknown data R, G and B values are identified and designated as $R_f$, $G_f$ and $B_f$. The resulting color dropout function are obtained and shown in Eq (6)

$$D(r, g, b) = C_{Rf} * A(r, R_f) + C_{Gf} * A(g, G_f) + C_{Bf} * A(b, B_f) \quad (6)$$

where $$C_{Rf} = R_f/(R_f + G_f + B_f)$$
$$C_{Gf} = G_f/(R_f + G_f + B_f)$$
$$C_{Bf} = B_f/(R_f + G_f + B_f)$$

Those skilled in the art will readily recognize that the computations of Eqs. (1) and (2) may be performed by the processor of the computer system 10, and the results input into the scanner 80.

Still referring to FIG. 2, the resulting RGB values are input into equation (6) for finding gray scale values for each pixel of the scanned image.

Through the functional transformation according Eq. 6 of the pixel values from color value ($r_i$, $g_i$, $b_i$) to a resulting gray scale value D($r_i$,$g_i$,$b_i$), the gray scale value (D($r_c$, $g_c$, $b_c$)) of the selected color is equal to the gray scale value (D($r_b$, $g_b$, $b_b$)) of the document background, where ($r_c$, $g_c$, $b_c$) and ($r_b$, $g_b$, $b_b$) are the color values of the selected color and the background, respectively. Since both gray scale values are identical for the selected color and the background, the resulting gray scale image will have one value for the background, and the remaining portions will have different gray scale values.

The gray scale values are then applied to a suitable thresholding technique, such as that in U.S. Pat. No. 5,583,659 for determining which values to retain and which to delete. The values at or below the threshold, preferably in the present invention, are retained and the numbers above the threshold are deleted.

The invention has been described in detail with particular reference to certain preferred embodiments thereof, but it will be understood that variations and modifications can be effected within the spirit and scope of the invention.

What is claimed is:

1. A method for performing color dropout on a digitized document, the method comprising the steps of:

(a) obtaining color values from the digitized document requiring only two colors, a background and a color of interest to a user;

(b) transforming the color values of the background and the color of interest into an identical gray scale value according to a color dropout function based substantially on a minimization process on substantially an entire measured color data set;

(c) obtaining a gray scale value different from the identical gray scale value for the remaining portion of the image according to the color dropout function; and (d) thresholding the gray scale values obtained from steps (b) and (c) to obtain a binary image that substantially eliminates color classification error and retains character integrity by a functional transformation that suppresses color fringe artifacts.

2. The method as in claim 1 further comprising the step of (e) obtaining the color dropout function by fitting the obtained color values into a specified color attenuation function.

3. The method as in claim 2, wherein step (e) includes selecting three gray value attenuation functions with unknown constants corresponding respectively to red, green and blue image data.

4. The method as in claim 3, wherein step (e) includes weighting each attenuation function by its respective normalization coefficient.

5. The method as in claim 4, wherein step (e) includes summing the three weighted gray value attenuation functions forming the dropout function.

6. The method as in claim 5, wherein step (e) includes obtaining the unknown constants in the dropout function by fitting the collected color values into the dropout function through a data fitting process.

7. The method as in claim 6, wherein step (e) includes substituting the obtained unknown constants into the dropout function which is ready for use to eliminate the color of interest.

8. The method as in claim 1, comprising the step of inputting every color value in every pixel of an image to the color dropout function to yield the gray scale image for obtaining a process that automatically completes the color dropout.

9. The method as in claim 1, comprising the step of converting the gray scale image into a binary image for improving contrast of the gray scale image.

* * * * *